United States Patent
Zheng

(10) Patent No.: US 11,766,728 B2
(45) Date of Patent: Sep. 26, 2023

(54) MANUFACTURING METHOD OF TEXTURED AND COATED ELECTRODE WIRE

(71) Applicant: NINGBO KANGQIANG MICRO-ELECTRONICS TECHNOLOGY CO., LTD., Zhejiang (CN)

(72) Inventor: Fang Zheng, Zhejiang (CN)

(73) Assignee: NINGBO KANGQIANG MICRO-ELECTRONICS TECHNOLOGY CO., LTD., Zhejiang (CN)

(*) Notice: Subject to any disclaimer, the term of this patent is extended or adjusted under 35 U.S.C. 154(b) by 318 days.

(21) Appl. No.: 16/496,813

(22) PCT Filed: Sep. 26, 2018

(86) PCT No.: PCT/CN2018/107669
§ 371 (c)(1),
(2) Date: Sep. 23, 2019

(87) PCT Pub. No.: WO2019/062768
PCT Pub. Date: Apr. 4, 2019

(65) Prior Publication Data
US 2021/0101217 A1    Apr. 8, 2021

(30) Foreign Application Priority Data
Sep. 26, 2017    (CN) .......................... 201710879624.9

(51) Int. Cl.
*B23H 7/22*    (2006.01)
*B23K 35/40*    (2006.01)
(Continued)

(52) U.S. Cl.
CPC ............... *B23H 7/22* (2013.01); *B23H 7/24* (2013.01); *B23K 35/40* (2013.01); *C25D 5/48* (2013.01); *C25D 5/50* (2013.01); *C25D 7/0607* (2013.01)

(58) Field of Classification Search
CPC ....................... B23H 1/04–06; B23H 7/08–10
See application file for complete search history.

(56) References Cited

U.S. PATENT DOCUMENTS 4,988,552 A     1/1991  Tomalin
5,196,665 A *   3/1993  Briffod ............... B23H 7/08
                                                 219/69.12

(Continued)

FOREIGN PATENT DOCUMENTS

CN     633739 A5 *  12/1982
CN  101537519 A      9/2009
(Continued)

OTHER PUBLICATIONS

Meng et al., machine translation, CN 103537768 A (Year: 2014).*
(Continued)

*Primary Examiner* — Hosung Chung
(74) *Attorney, Agent, or Firm* — Polsinelli PC; Rong Yang

(57) ABSTRACT

A manufacturing method of a textured and coated electrode wire, comprising: selecting a copper-zinc alloy as a core material, preparing, by means of electroplating/hot-dipping, a metal zinc coating on a surface of the wire material, then performing pre-treatment on the coated electrode wire by means of discontinuous diffusion annealing to obtain a coated electrode wire material having a multi-layer structure of Zn/β-brass & γ-brass/α-brass, and then using multiple cold drawing treatments and a stress-relief annealing treatment to modify the electrode wire and obtain a textured and coated electrode wire material. Compared to conventional (Continued)

copper alloy electrode wires and zinc-coated electrode wires, the material has advantages of a fast cutting speed, low cutting cost, low environmental pollution, etc., wherein the cutting speed increases by 12% or more when compared with copper alloy electrode wire, the wire breakage rate during cutting processes decreases by 30%, and the replacement time interval of an ion-exchange resin filter for cooling water increases by 10%.

9 Claims, 3 Drawing Sheets

(51) Int. Cl.
    C25D 5/48      (2006.01)
    C25D 5/50      (2006.01)
    C25D 7/06      (2006.01)
    B23H 7/24      (2006.01)

(56) References Cited

U.S. PATENT DOCUMENTS

| | | | | |
|---|---|---|---|---|
| 5,808,262 A | * | 9/1998 | Mukherjee | B23H 7/08 219/69.12 |
| 2006/0219666 A1 | | 10/2006 | Shin | |
| 2011/0290531 A1 | * | 12/2011 | Baumann | B23H 7/08 174/126.2 |
| 2015/0027991 A1 | * | 1/2015 | Weber | B23H 7/08 219/69.15 |

FOREIGN PATENT DOCUMENTS

| | | | | |
|---|---|---|---|---|
| CN | 102172994 A | | 9/2011 | |
| CN | 102528190 A | | 7/2012 | |
| CN | 103273150 A | | 9/2013 | |
| CN | 103537768 A | * | 1/2014 | |
| CN | 103537768 A | | 1/2014 | |
| CN | 105834533 A | | 8/2016 | |
| CN | 106270848 A | * | 1/2017 | |
| CN | 106808037 A | | 6/2017 | |
| CN | 107671379 A | | 2/2018 | |
| EP | 0 526 361 A1 | * | 7/1992 | |
| EP | 3006152 A1 | | 4/2016 | |
| JP | 4012876 B2 | | 9/2007 | |
| JP | 4012895 B2 | | 9/2007 | |
| JP | 2015003347 A | * | 1/2015 | ............... B23H 7/08 |

OTHER PUBLICATIONS

Lou et al., Electroplating, Encyclopedia of Chem. Proc. (Year: 2006).*
Taitel et al., Encyclopedia of Two-Phase Heat Transfer and Flow I (Year: 2016).*
Pfau et al., Machine Translation, CH 633739 A5 (Year: 1982).*
Zeiger, Original & Machine Translation, WO 2014032635 A1 (Year: 2014).*
International Search Report and Written Opinion of the International Searching Authority, PCT/CN2018/107669, dated Dec. 28, 2018.
Supplementary European Search Report and Written Opinion, EP 18 86 0075, dated Apr. 16, 2020.

* cited by examiner

MANUFACTURING METHOD OF TEXTURED AND COATED ELECTRODE WIRE

CROSS-REFERENCE TO RELATED APPLICATION

The present application is a national stage filing under 35 U.S.C § 371 of International Patent Application No. PCT/CN2018/107669, filed Sep. 26, 2018, which claims the benefit of the Chinese Patent Application No. 201710879624.9, filed on Sep. 26, 2017, the entire contents of each of which are incorporated herein by reference in their entireties.

TECHNICAL FIELD

The invention relates to the technical field of material surface treatment, in particular to a method of preparing an electrode wire with a textured coating structure and with a high cutting speed, a low cutting cost and a low environmental pollution.

BACKGROUND ART

WEDM-LS is a WEDM technology that uses a continuously moving fine wire (called as an electrode wire, such as a copper-zinc alloy wire or a galvanized wire) as an electrode and is a cutting and forming method that etches a metal of the cutting workpiece by pulse spark discharge. Currently, WEDM-LS is also widely used in the manufacture of molds, forming tools, precision small parts and special materials. Therefore, the flexible electrode wires as consumables also has an increasing demand, and it is a key factor affecting the surface finish of the cutting workpiece and the cutting efficiency. With the development of WEDM-LS technology, the electrode wire material has also undergone several progress stages: firstly, ordinary copper wire, that is, drawn copper wire is directly used as the electrode wire. In general, the higher the zinc content in the alloy, the better the discharge performance, but when the zinc content exceeds 40 wt. %, the ductility of the wire starts to deteriorate, thereby increasing the manufacturing cost of the electrode wire. Subsequently, the coated electrode wire has been widely used, and the wire has been plated a zinc layer on the surface of the ordinary copper wire by electroplating and/or hot dip plating, which has a lubricating effect, thereby increasing the cutting speed. In recent years, the improved coated electrode wires, such as porous electrode wires, have been widely used due to their high cutting speed. Therefore, the optimization of the surface microstructure of the coating and the manufacturing cost have become an important direction for the development of such wires.

Patent ZL201610260886.2 and patent ZL201310562102.8 indicate that by forming longitudinal cracks on the surface of the electrode wire coating, the stability of the discharge performance and the cutting speed of the electrode wire can be improved. Patent ZL201510868517.7 states that the fish scale structure microstructure can greatly increase the cutting rate of the galvanized electrode wire, thereby reducing the cost. Therefore, the research on the distribution and the orientation of cracks on the surface of the coating has become an important direction for the development of new electrode wire materials. In addition, the presence of surface microstructure can also improve the lubricity of the electrode wire and water, thereby improving the cooling efficiency and reducing the number of times of cutting break.

Therefore, the applicant believes that it is necessary to propose a new method of preparing the electrode wire with the textured coating structure, thereby improving the processing efficiency of the electrode wire, reducing the cutting cost, and reducing environmental pollution.

SUMMARY OF THE INVENTION

The object of this invention is to provide a method of preparing a transversely textured coating electrode wire with high cutting speed, low cutting cost and low environmental pollution in order to solve the deficiencies of above-mentioned prior art.

In order to achieve the above object, the designed method of preparing textured plated electrode wire of the invention includes the following steps:

step (1), preparing a metal zinc plating layer on the surface of a copper-zinc alloy electrode wire by electroplating and/or hot dip plating;

step (2), pre-drawing the galvanized electrode wire blank by a cold drawing technique;

step (3), forming a coated electrode wire having a multilayer structure of $Zn/\beta$-brass & $\gamma$-brass/$\alpha$-brass by a discontinuous heat treatment technique;

step (4), preparing a micro-textured electrode wire by cold drawing, and obtaining a plated electrode wire material having a regular texture by controlling the process of the electroplating/the hot dip plating, the discontinuous heat treatment technique, and the cold drawing technique, wherein the obtained plated electrode wire has regular strip cracks on its surface.

Further, step (1) comprises selecting a copper-zinc alloy having a diameter of 1.0 mm to 1.5 mm (such as Cu/Zn: 60/40, 63/37, 65/35, etc.) as a core material, after the post-treatment of removing the oil, removing the rust and cleaning, and depositing a metal plating layer on the surface of the copper-zinc alloy wire by electroplating/hot dip plating technology, and the plated electrode wire material having different plated thickness is obtained by adjusting the preparation process.

Step (2) comprises selecting the plated electrode wire obtained in step (1) as a starting material, and pre-drawing by a cold drawing technique so as to obtain an electrode wire blank having a diameter of 0.5 mm to 1.0 mm.

Step (3) comprises selecting the plated electrode wire obtained in step (2) as a starting material, placing into vacuum/inert heating furnace, and diffusion treating the electrode wire by two-stage or multi-stage temperature gradient, and the electrode wire blank with $Zn/\beta$-brass & $\gamma$-brass/$\alpha$-brass multilayer structure is formed by adjusting parameters of the processing temperature and the processing time.

Step (4) comprises selecting the electrode wire blank with multilayer structure obtained in step (3) as a starting material and drawing at a certain speed, and the plated electrode wire material having a diameter of 0.15 mm to 0.5 mm and having a textured structure is formed from the electrode wire blank with $Zn/\beta$-brass & $\gamma$-brass/$\alpha$-brass multilayer structure and different elongations by adjusting parameters of the drawing pass, the drawing diameter ratio and the drawing speed.

As a preferred embodiment, step (1) comprises selecting a copper-zinc alloy as a core material, after removing the oil, removing the rust and cleaning, and preparing a galvanized layer on the surface of the copper alloy wire by electroplating/hot dip plating technology, and the wire blank having a zinc layer thickness of 2 µm to 20 µm is obtained by adjusting the plating current, the voltage and the time as well as the dip plating process.

Step (2) comprises selecting the galvanized electrode wire blank obtained in step (1) as a starting material, and preparing the electrode wire blank having a diameter of 0.5 mm to 1.0 mm by controlling parameters of number of the drawing passes, the diameter ratio of the diameter before drawing and that after drawing, and the drawing speed.

Step (3) comprises selecting a vacuum and inert atmosphere furnace and discontinuous thermal diffusion treating the pre-drawed electrode wire blank obtained in step (2), wherein the treatment process is a two-stage or multi-stage thermal diffusion treatment, specifically, a bell-type vacuum heat treatment furnace is used during the thermal diffusion process, and the treatment process is thermal diffusion treatment at 150° C. to 200° C. and 300° C. to 400° C. two-stage temperature for 80-500 minutes.

Step (3) comprises selecting a bell-type vacuum heat treatment furnace during the thermal diffusion treatment, and the treatment process is thermal diffusion treatment at 150° C. to 200° C. and 300° C. to 400° C. two-stage temperature for 80-500 minutes.

The wire blank obtained in step (3) is a multilayer structure such as Zn/β-brass & γ-brass/α-brass, wherein the thickness and the composition of the β-brass and γ-brass intermediate layer are closely related to the treatment temperature and time, while different layers have different characteristics of organization, structure and elongation.

Step (4) comprises selecting the wire blank with multilayer structure obtained in step (3), and drawing above wire into a micro-textured electrode wire of 0.15 mm to 0.5 mm by a drawing treatment of 5 passes at a drawing speed of 600 m/min to 1500 m/min, followed by a stress relief annealing treatment at a voltage of 20 to 50 V and a current of 5 to 30 A, thus obtaining an electrode wire having a textured coating.

Further, the cross-sectional structure of the textured coated electrode wire is a copper-zinc alloy core material and a regular transversely textured galvanized layer structure. Further the contact angle of the textured coating electrode wire with water is about 120°, which is significantly higher than that of the galvanized wire, thereby increasing the cooling effect of water.

Further, the number of times of cutting break of the textured coating electrode wire is 30% lower than that of the galvanized wire, and the replacement time of the cooling water ion resin filter is extended by 10%.

Compared with the prior art, the method of preparing the textured coated electrode wire obtained by the invention has the following advantages:

(1) The electrode wire coating provided by the invention has a regular transverse texture, which gives the electrode wire material a better cooling effect and a higher cutting rate, and significantly improves the performance of the electrode wire, for example, compared with the galvanized wire, the cutting speed is increased by more than 12%, the number of cutting breaks is reduced by 30%, and the replacement time of the cooling water ion resin filter is extended by 10%.

(2) Particularly preferably, the tensile strength, the elongation and the surface roughness of the cut sample achieved by the electrode wire with a regular transverse texture coating of the present invention are comparable to those achieved by the galvanized wire.

(3) The textured coated electrode wire provided by the invention has the advantages of low production cost, simple process and easy for industrial application.

DETAILED DESCRIPTION OF THE INVENTION

The invention will now be further described with reference to the drawings and embodiments.

Example 1

As shown in FIGS. 1-4, the method of preparing the textured coated electrode wire provided in this example was carried out according to the following steps:

Step (1), preparing a zinc plating layer on the surface of the copper-zinc alloy core material: firstly, the cleaned zinc alloy core material (Cu/Zn: 60/40) was subjected to electroplating/hot dip plating treatment, and a zinc plating having a thickness of 5 µm was obtained by adjusting the galvanizing process;

Step (2), pre-drawing treatment: selecting the above-mentioned plating electrode wire as a starting material, and performing pre-drawing treatment by cold drawing technology to obtain a electrode wire blank having a diameter of 0.5 mm;

Step (3), diffusion heat treatment: the electrode wire blank obtained in step (2) was subjected to diffusion heat treatment by a discontinuous heat treatment method, and a process of 150° C. to 200° C. and 300° C. to 400° C. two-stage temperature for 250 minutes was selected for thermal diffusion treatment. After thermal diffusion, the zinc plating layer and the copper-zinc alloy core material underwent an interdiffusion reaction to form an electrode wire blank having a Zn/β-brass & γ-brass/α-brass multilayer structure;

Step (4), cold drawing treatment: selecting the wire blank having a multilayer structure treated by the diffusion heat treatment in step (3), and drawing the above-mentioned wire into a micro-texture electrode wire of 0.3 mm at a drawing speed of 1000 m/min. The wire was then subjected to stress relief annealing at a voltage of 30 V and a current of 10 A to obtain a textured plated electrode wire.

The textured plated electrode wire obtained by the method of preparing the textured plated electrode wire provided in the example has regular transverse cracks and a certain microporosity.

Figure 1:
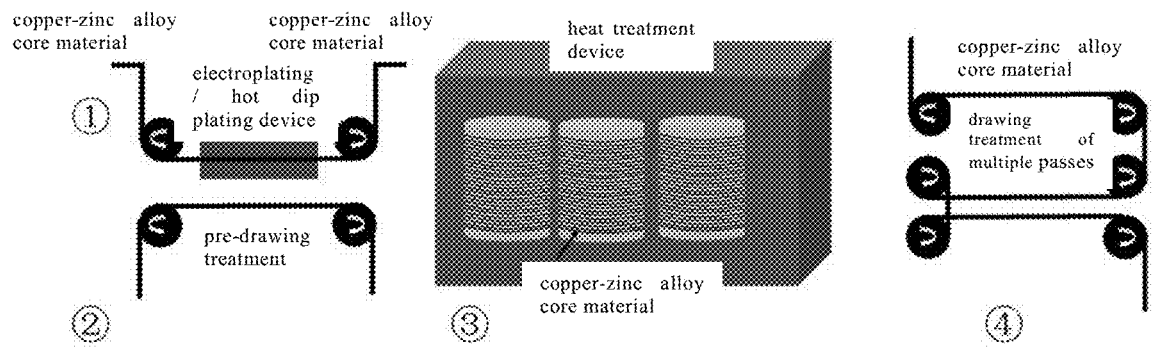
FIG. 1 is a schematic view showing the preparation process of the textured plating electrode wire in Example 1.
Figure 2:
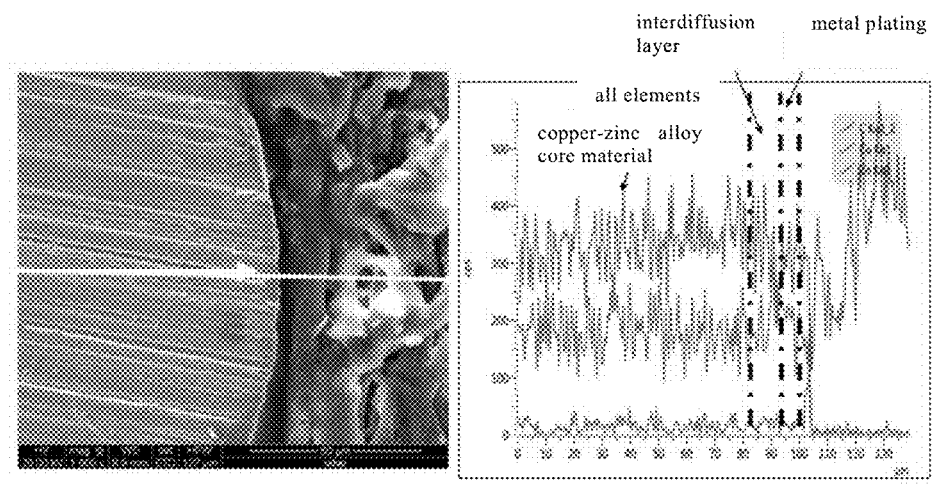
FIG. 2 is a diagram showing the microstructure and the composition of the wire blank having a multilayer structure in Example 1.
Figure 3:
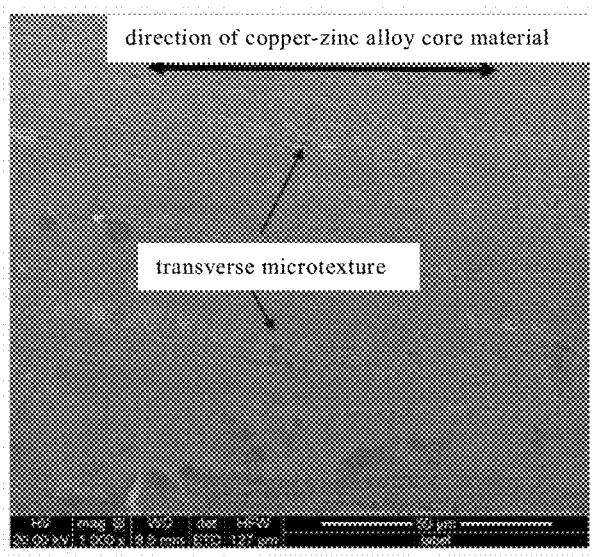
FIG. 3 is a surface topographical view of the plated electrode wire with a transversely texture in Example 1.
Figure 4:
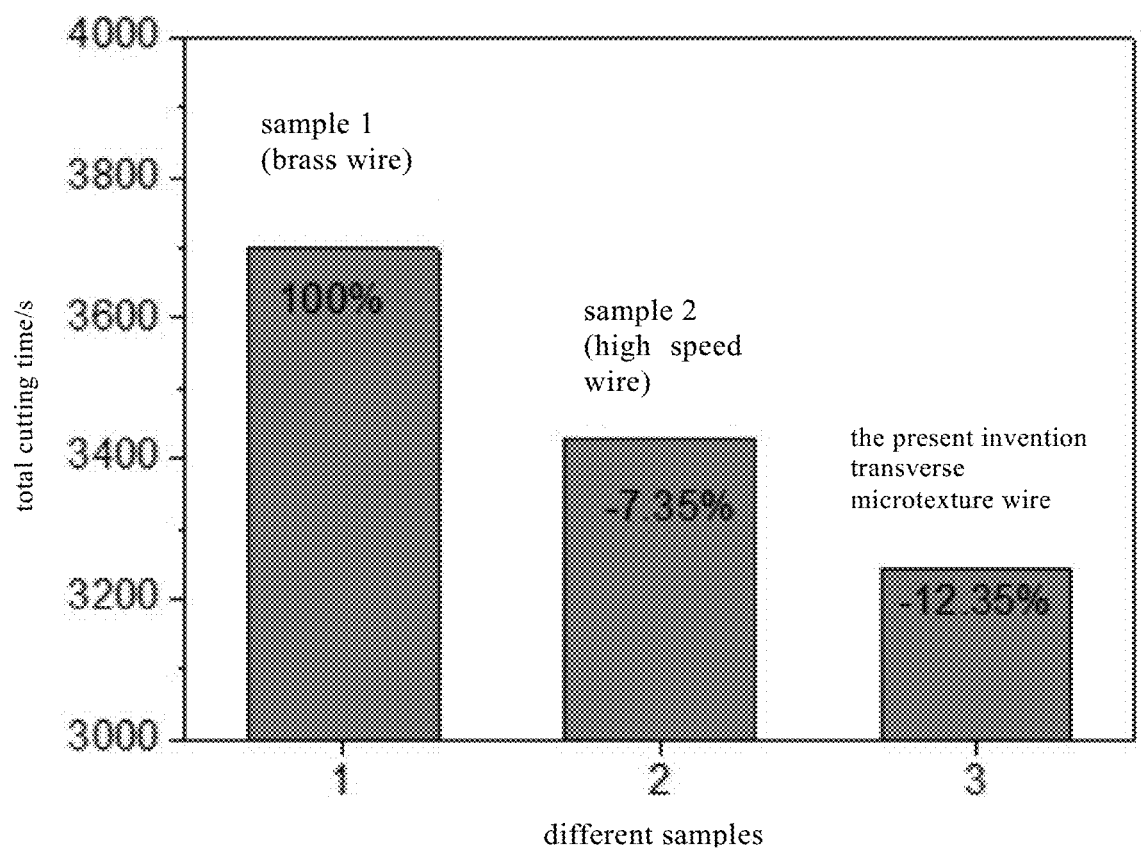
FIG. 4 is a graph showing the comparison of the cutting speeds of different electrode wires in Example 1.

Data analysis: FIG. 2 is a schematic structural view and a micrograph of the wire blank having a multi-layer structure in the example, and it can be seen that the wire blank has a three-layer structure; FIG. 3 is a surface topography of the plated electrode wire having a horizontal texture in the example, and it can be seen that the electrode wire has regular transverse cracks; FIG. 4 is a comparison chart of the cutting speed of different electrode wires, and it can be seen that the cutting speed of the electrode wire in the example is 12.35% faster than that of the brass wire, which is obviously advantageous.

At the same time, the electrode wire coating provided by this example has a regular transverse texture, which gives the electrode wire material a better cooling effect and a higher cutting rate, and significantly improves the performance of the electrode wire, for example, compared with the galvanized wire, the cutting speed is increased by more than 12%, the number of cutting breaks is reduced by 30%, and the replacement time of the cooling water ion resin filter is extended by 10%.

The cross-sectional structure of the textured coated electrode wire is a copper-zinc alloy core material and a regular transversely textured galvanized layer structure. The textured galvanized electrode wire has a tensile strength of 900 MPa to 1200 MPa and an elongation of 1% to 5%. The contact angle of the textured coating electrode wire with water is about 120°, which is significantly higher than that of the galvanized wire, thereby increasing the cooling effect of water. The number of times of cutting break of the textured coating electrode wire is 30% lower than that of the galvanized wire, and the replacement time of the cooling water ion resin filter is extended by 10%.

Example 2

The method of preparing the textured coated electrode wire provided in this example was carried out according to the following steps:

Step (1), preparing a zinc plating layer on the surface of the copper-zinc alloy core material: firstly, the cleaned zinc alloy core material (Cu/Zn: 60/40) was subjected to electroplating/hot dip plating treatment, and a zinc plating having a thickness of 10 μm was obtained by adjusting the galvanizing process;

Step (2), pre-drawing treatment: selecting the above-mentioned plating electrode wire as a starting material, and performing pre-drawing treatment by cold drawing technology to obtain a electrode wire blank having a diameter of 0.8 mm;

Step (3), diffusion heat treatment: the electrode wire blank obtained in step (2) was subjected to diffusion heat treatment by a discontinuous heat treatment method, and a process of 150° C. to 200° C. and 300° C. to 400° C. two-stage temperature for 300 minutes was selected for thermal diffusion treatment. After thermal diffusion, the zinc plating layer and the copper-zinc alloy core material underwent an interdiffusion reaction to form an electrode wire blank having a Zn/β-brass & γ-brass/α-brass multilayer structure;

Step (4), drawing treatment: selecting the wire blank having a multilayer structure treated by the diffusion heat treatment in step (3), and drawing the above-mentioned wire into a micro-texture electrode wire of 0.3 mm at a drawing speed of 1000 m/min. The wire was then subjected to stress relief annealing at a voltage of 30 V and a current of 10 A to obtain a textured plated electrode wire.

The textured plated electrode wire obtained by the method of preparing the textured plated electrode wire provided in the example has regular transverse cracks and a certain microporosity.

It has been tested that the cutting speed of the electrode wire in this example is 1²0.17% faster than that of the brass wire, which is obviously advantageous.

Example 3

The method of preparing the textured coated electrode wire provided in this example was carried out according to the following steps:

Step (1), preparing a zinc plating layer on the surface of the copper-zinc alloy core material: firstly, the cleaned zinc alloy core material (Cu/Zn: 63/37) was subjected to electroplating/hot dip plating treatment, and a zinc plating having a thickness of 5 μm was obtained by adjusting the galvanizing process;

Step (2), pre-drawing treatment: selecting the above-mentioned plating electrode wire as a starting material, and performing pre-drawing treatment by cold drawing technology to obtain a electrode wire blank having a diameter of 0.5 mm;

Step (3), diffusion heat treatment: the electrode wire blank obtained in step (2) was subjected to diffusion heat treatment by a discontinuous heat treatment method, and a process of 150° C. to 200° C. and 300° C. to 400° C. two-stage temperature for 400 minutes was selected for thermal diffusion treatment. After thermal diffusion, the zinc plating layer and the copper-zinc alloy core material underwent an interdiffusion reaction to form an electrode wire blank having a Zn/β-brass & γ-brass/α-brass multilayer structure;

Step (4), drawing treatment: selecting the wire blank having a multilayer structure treated by the diffusion heat treatment in step (3), and drawing the above-mentioned wire into a micro-texture electrode wire of 0.15 mm at a drawing speed of 1000 m/min. The wire was then subjected to stress relief annealing at a voltage of 50 V and a current of 30 A to obtain a textured plated electrode wire.

The textured plated electrode wire obtained by the method of preparing the textured plated electrode wire provided in the example has regular transverse cracks and a certain microporosity.

It has been tested that the cutting speed of the electrode wire in this example is 12.85% faster than that of the brass wire, which is obviously advantageous.

Example 4

The method of preparing the textured coated electrode wire provided in this example was carried out according to the following steps:

Step (1), preparing a zinc plating layer on the surface of the copper-zinc alloy core material: firstly, the cleaned zinc alloy core material (Cu/Zn: 65/35) was subjected to electroplating/hot dip plating treatment, and a zinc plating having a thickness of 8 μm was obtained by adjusting the galvanizing process;

Step (2), pre-drawing treatment: selecting the above-mentioned plating electrode wire as a starting material, and performing pre-drawing treatment by cold drawing technology to obtain a electrode wire blank having a diameter of 0.5 mm;

Step (3), diffusion heat treatment: the electrode wire blank obtained in step (2) was subjected to diffusion heat treatment by a discontinuous heat treatment method, and a process of 150° C. to 200° C. and 300° C. to 400° C. two-stage temperature for 500 minutes was selected for thermal diffusion treatment. After thermal diffusion, the zinc plating layer and the copper-zinc alloy core material underwent an interdiffusion reaction to form an electrode wire blank having a Zn/β-brass & γ-brass/α-brass multilayer structure;

Step (4), drawing treatment: selecting the wire blank having a multilayer structure treated by the diffusion heat treatment in step (3), and drawing the above-mentioned wire into a micro-texture electrode wire of 0.2 mm at a drawing speed of 1000 m/min. The wire was then subjected to stress relief annealing at a voltage of 20 V and a current of 5 A to obtain a textured plated electrode wire.

The textured plated electrode wire obtained by the method of preparing the textured plated electrode wire provided in the example has regular transverse cracks and a certain microporosity.

It has been tested that the cutting speed of the electrode wire in this example is 12.58% faster than that of the brass wire, which is obviously advantageous.

It is to be understood that the above-described examples are merely illustrative of the technical concept and the features of the present invention, and are intended to enable those skilled in the art to understand the present invention and to implement the present invention, which does not limit the protection scope of the present invention. Equivalent variations or modifications made in accordance with the spirit of the invention are intended to be included within the scope of the invention.

The invention claimed is:

1. A method of preparing a textured coated electrode wire, comprising:

Step (i), preparing a metal zinc plating layer on a surface of a brass electrode wire by electroplating or hot dip plating to form a galvanized electrode wire;

step (ii), pre-drawing the galvanized electrode wire by a cold drawing technique to form a pre-drawn galvanized electrode wire;

step (iii), treating the pre-drawn galvanized electrode wire by a two-stage discontinuous heat treatment in a vacuum or an inert atmosphere furnace to form a coated electrode wire having a multilayer structure of Zn/p-brass & y-brass/a-brass; and step (iv), cold drawing the coated electrode wire to prepare the textured coated electrode wire wherein the processes of the electroplating or hot dip plating in step (i), the discontinuous heat treatment in step (iii), and the cold drawing in step (iv) are so controlled as to prepare the textured coated electrode wire having regular transverse texture and microcracks on its surface, having a cutting speed more than 12% faster than that of an uncoated brass electrode wire, and having a tensile strength of 900 MPa to 1200 MPa and an elongation of 1% to 5%;

wherein the two-stage discontinuous heat treatment of step (iii) comprises selecting a bell-type vacuum heat treatment furnace as the vacuum or an inert atmosphere furnace; placing the pre-drawn galvanized electrode wire into said heat treatment furnace; diffusion treating the pre-drawn galvanized electrode wire first at 150° C. to 200° C. and then at 300° C. to 400° C. for a period of 80-500 minutes, thereby forming the Zn/13-brass & v-brass/a-brass multilayer structure.

2. The method of claim 1, wherein the obtained plated prepared textured coated electrode wire has a contact angle with water of 120°.

3. The method of claim 1, wherein the brass electrode wire of step (i) has a diameter of 1.0 mm to 1.5 mm.

4. The method of claim 3, wherein the electroplating of step (i) comprises adjusting plating current, voltage and time so as to obtain the galvanized electrode wire having a zinc layer thickness of 2 μm to 20 μm.

5. The method of claim 3, wherein the hot dip plating of step (i) is adjusted so as to obtain the galvanized electrode wire having a zinc layer thickness of 2 μm to 20 μm.

6. The method of claim 1, wherein step (ii) pre-drawing by the cold drawing technique is operated so as to obtain the pre-drawn galvanized electrode wire having a diameter of 0.5 mm to 1.0 mm.

7. The method of claim 6, wherein the cold drawing technique of step (ii) comprises controlling parameters of number of drawing passes, diameter ratio before and after drawing and drawing speed so as to obtain the pre-drawn galvanized electrode wire having a diameter of 0.5 mm to 1.0 mm.

8. The method of claim 1, wherein the cold drawing of step (iv) comprises adjusting parameters selected from the group consisting of number of drawing passes, diameter ratio of the brass electrode wire diameter before drawing to that after drawing, and drawing speed, so that the coated brass electrode wire has a diameter of 0.15 mm to 0.5 mm and has a textured structure with Zn/β-brass & γ-brass/α-brass multilayer and a capability of having different elongations.

9. The method of claim 8, wherein the cold drawing of step (iv) comprises 5 drawing passes, each pass at a drawing speed of 600 m/min to 1500 m/min, followed by a stress relief annealing treatment at a voltage of 20 to 50 V and a current of 5 to 30 A.

* * * * *